UNITED STATES PATENT OFFICE.

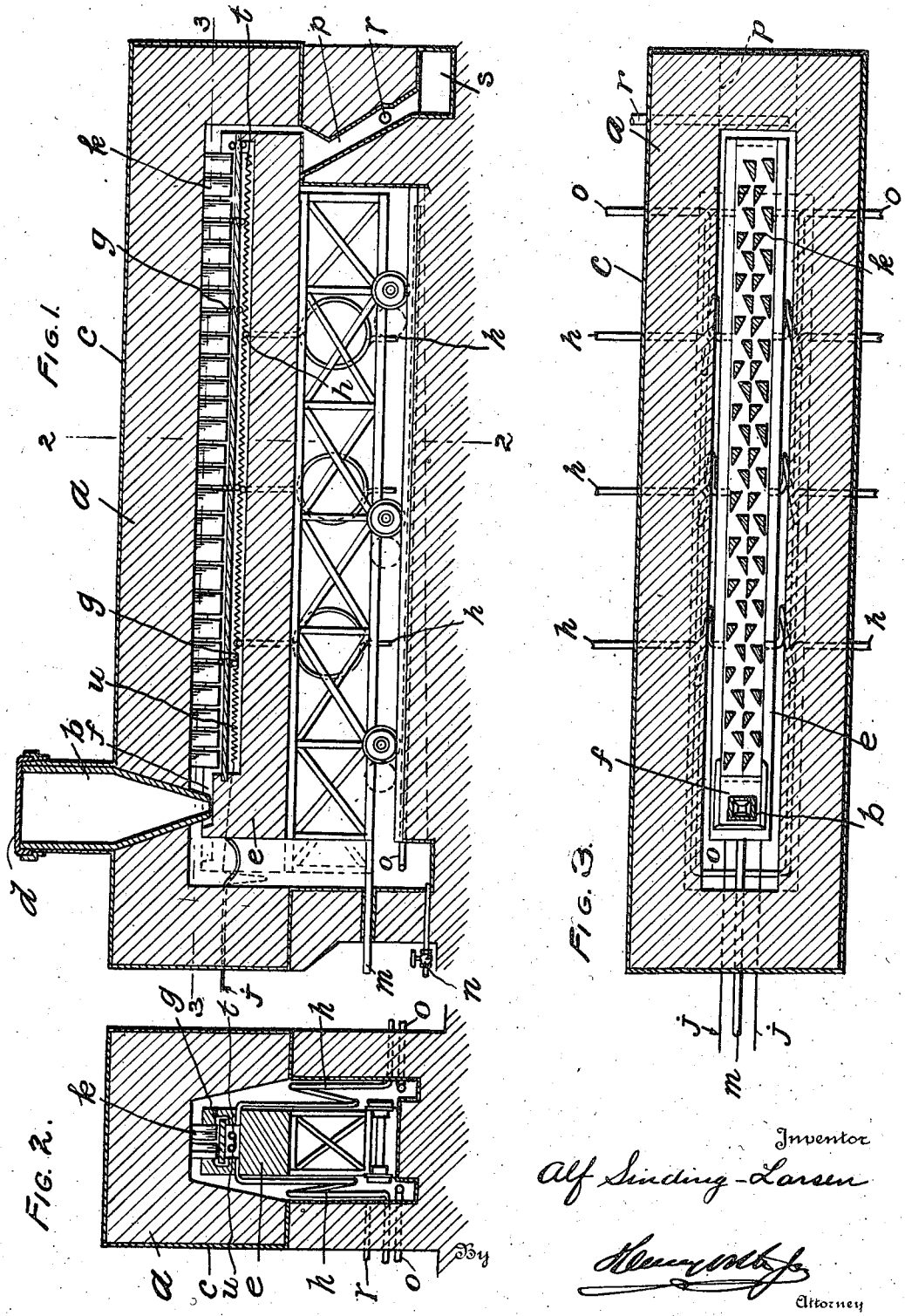

ALF SINDING-LARSEN, OF VESTRE AKER, NEAR CHRISTIANIA, NORWAY.

PRODUCTION OF IRON SPONGE FROM IRON ORE.

1,256,939.  Specification of Letters Patent.  Patented Feb. 19, 1918.

Application filed March 21, 1917. Serial No. 156,504.

*To all whom it may concern:*

Be it known that I, ALF SINDING-LARSEN, a subject of the King of Norway, residing at Vestre Aker, near Christiania, Norway, have invented certain new and useful Improvements in the Production of Iron Sponge from Iron Ore; and I do hereby declare the following to be a full, clear, and exact description of the invention, such as will enable others skilled in the art to which it appertains to make and use the same.

My invention relates to the production of iron sponge directly from iron ore according to the socalled dry reduction process and comprises the combination of operations and means below described and claimed.

When iron oxid is treated with hydrogen or a hydrogen containing gas or other gaseous reduction material which acting on the raw material produces gases or vapors as reduction products, and the reaction being to a certain degree reversible, it is necessary to remove the said gases or vapors as they are formed. This has hitherto been carried out in such a manner that the whole volume of gas has been caused to pass the raw material, and the products of reaction and remainders from the raw materials have been then removed. In some cases this current of gases has been caused to circulate between the reduction apparatus and other devices, in which the products of reaction have been absorbed.

It is however obvious that when carrying out the process in this way there occur losses of heat as well as of raw materials.

My invention consists in a process and means for carrying out the same of such nature as to permit the carrying out of the reduction processes without loss of heat or of raw material. According to my invention the raw material is heated to a suitable temperature in an atmosphere of reduction gas for instance hydrogen in an upper zone of a reduction chamber, the latter having a lower zone containing means for the absorption or condensation of the reaction products, for instance water.

The principle of this process is that the vapors formed by the reduction process in the upper heated zone by way of diffusion pass through the gas atmosphere down to the lower zone, which on account of being cooled causes the vapors to condense or to be absorbed. As the hot gases will remain in the upper part of the reaction chamber, a circulation of the whole volume of gas cannot take place. Vapors especially water vapors diffuse very quickly through hydrogen and therefore will pass with sufficient speed from the upper reduction zone down to the condensation zone, because in this lower zone the partial-pressure of the water vapors will be very low, whereas this pressure will be very great in the hot zone, where the vapors are formed. It will also be understood that the hydrogen through which the vapors pass on their way from the upper hot to the lower cold zone will be pre-heated, the vapors giving off heat so that a considerable saving of heat is attained.

When carrying out my process I prefer to carry out the last part of the reduction by means of a perfectly dry current of reducing gas, because as is well known it is difficult to perform a complete reduction of iron oxid in an atmosphere containing material quantities of water vapor.

The product of reduction is finally transferred for instance to an electrical smelting furnace for being melted, and to prevent reoxidation these procedures may be carried out in an atmosphere of hydrogen.

In order that my invention shall be fully understood I shall now describe one form of apparatus by which it may be carried out.

In the drawing Figure 1 is a longitudinal section, Fig. 2 a cross section on line —2— of Fig. 1 and Fig. 3 a horizontal section on line 3—3 of Fig. 1 of a reduction furnace according to my invention.

$a$ represents the masonry inclosing the furnace or reaction chamber. Within the chamber, on suitable rails, is placed a car carrying a hearth $e$. To this car with the hearth may be imparted a reciprocating motion by means of the rod $m$. Its foremost position is indicated in dotted lines. In the hearth is a hollow space $t$ covered by a plate or plates of iron or steel on which the iron ore is spread. In the hollow space which by way of channels $g$ (Fig. 2) communicates with the space above are arranged electrical resistance elements $u$ for heating the hearth.

$b$ is a hopper closed gas-tight by means of the cover $d$. The lower end of this hopper forms a narrow opening close above an elevated portion $f$ of the hearth. In the position shown with dotted lines this elevated portion will be moved behind the hopper opening and ore will then rush out on the heated plates of the hearth. In this manner from time to time a certain amount of raw material will be fed from the hopper to the hearth. From the roof of the masonry $e$, depending close to the iron plates of the hearth are arranged rows of bodies $k$, having in cross section a pointed or triangular form. These bodies will dip into the ore and when the hearth is moving forward from the position shown to the position indicated in dotted lines, the back square faces of said bodies will act to hold the ore back from following the hearth, whereas when the hearth is moving in the other direction the pointed end of the bodies will not prevent the ore from taking part in the movement of the hearth. In this manner the ore on the hearth will be successively fed backwardly.

The upper part of the masonry of the furnace is covered with a tight mantle of iron $c$. A similar covering is arranged inside of the masonry in the lower part of the apparatus. The water of condensation collects in a sump at one end of the furnace and from here drawn off through the cock $n$.

$h$ are pipes for supplying hydrogen to the hearth as shown. $r$ is a pipe which also supplies hydrogen, but this hydrogen passes to the upper part of the reaction chamber through the channel $p$ at the end of the chamber, where the produced iron sponge drops off from the hearth to be taken up in the reservoir $s$. This hydrogen serves to complete the reduction of the raw material as above mentioned.

$o$ are pipes serving to cool the lower part of the reaction chamber. These pipes may be supplied with cold water or may be cooled by other means. $j$ are the conductors for supplying electric current to the resistance $u$.

I claim:

1. In the production of iron sponge from iron ore according to the dry reduction process the step which consists in causing pulverulent raw material to be acted upon by a gaseous reducing agent in the upper heated zone of a reaction chamber, causing simultaneously therewith a condensation or absorption of products of reaction, such as water, in a lower zone.

2. In the production of iron sponge from iron ore according to the dry reduction process the step which consists in causing pulverulent raw material to be acted upon by a gaseous reducing agent in the upper heated zone of a reaction chamber, causing simultaneously therewith a condensation or absorption of products of reaction, such as water, in a lower zone, and introducing a gaseous reducing agent into the reaction chamber in a direction counter to the flow of the hot reaction vapors.

3. In the production of iron sponge from iron ore according to the dry reduction process the step which consists in causing pulverulent raw material to be acted upon by a gaseous reducing agent in the upper heated zone of a reaction chamber, causing simultaneously therewith a condensation or absorption of products of reaction, such as water, in a lower zone, introducing gaseous reducing agent into the reaction chamber in a direction counter to the flow of the hot reaction vapors and introducing a portion of perfectly dried gaseous reducing agent separately in the part of the reaction chamber when the heated materials are removed from the chamber.

4. In the production of iron sponge from iron ore according to the dry reduction process, a reaction chamber, a hearth therein, means to feed pulverulent raw material across the hearth, means to heat the zone of the reaction chamber in which said hearth is arranged, means to cool a lower zone in the reaction chamber, means to introduce a gaseous reducing agent into the reaction chamber, so as to cause a preheating of the same on its way from the cooler to the warmer zones of the chamber and means to take up and carry away the products of condensation.

5. In the production of iron sponge from iron ore according to the dry reduction process the combination with a reaction chamber having a high temperature zone at the top and a low temperature zone at the bottom, of a furnace hearth, means to impart a reciprocating motion and means to prevent the material on the hearth from adhering to the same when it moves toward the end of chamber in which the raw material is introduced.

6. In the production of iron sponge from iron ore according to the dry reduction process the combination with a reaction chamber having a high temperature zone at the top and a low temperature zone at the bottom, of a furnace hearth, means to impart a reciprocating motion and a series of bodies depending from the roof of the chamber toward the surface of the hearth, said bodies having a horizontal cross section of such form as to retain the material when the hearth is moving in one direction, and to exert no or little resistance when the hearth is moving in the other direction.

7. In the production of iron sponge from iron ore according to the dry reduction process the combination with a reaction chamber having a high temperature zone at the top and a low temperature zone at the bottom, of a furnace hearth, means to impart a reciprocating motion to the latter and a hopper for automatically feeding raw material to one end of the hearth, and an elevated surface at the receiving end of the hearth to close the opening of the hopper during part of the movement of the hearth.

In testimony that I claim the foregoing as my invention, I have signed my name in presence of two subscribing witnesses.

ALF SINDING-LARSEN.

Witnesses:
C. NORMAN,
KARL L. LEE.